US011502953B2

(12) United States Patent
Guo et al.

(10) Patent No.: US 11,502,953 B2
(45) Date of Patent: Nov. 15, 2022

(54) SERVICE PROCESSING METHOD AND NETWORK DEVICE

(71) Applicant: Huawei Technologies Co., Ltd., Shenzhen (CN)

(72) Inventors: Zun Guo, Nanjing (CN); Xiangyuan Tian, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 242 days.

(21) Appl. No.: 16/851,577

(22) Filed: Apr. 17, 2020

(65) Prior Publication Data

US 2020/0336422 A1 Oct. 22, 2020

(30) Foreign Application Priority Data

Apr. 19, 2019 (CN) .......................... 201910320133.X

(51) Int. Cl.
| | | |
|---|---|---|
| *H04L 12/741* | (2013.01) | |
| *G06F 9/46* | (2006.01) | |
| *H04L 45/74* | (2022.01) | |
| *H04L 69/22* | (2022.01) | |

(52) U.S. Cl.
CPC .............. *H04L 45/74* (2013.01); *G06F 9/465* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 9,276,852 | B2* | 3/2016 | Akiyoshi | ................ H04L 45/38 |
| 10,116,553 | B1* | 10/2018 | Penno | .................... H04L 45/306 |
| 10,855,546 | B2* | 12/2020 | Shokarev | ................ H04L 69/22 |
| 10,862,796 | B1* | 12/2020 | Dickinson | ............... H04L 45/64 |
| 2011/0158237 | A1* | 6/2011 | Mcdysan | ................ H04L 67/51 |
| | | | | 370/392 |
| 2011/0161416 | A1* | 6/2011 | Mcdysan | ............ H04L 67/1061 |
| | | | | 709/204 |
| 2014/0022900 | A1* | 1/2014 | Salot | ................ H04W 28/0284 |
| | | | | 370/235 |
| 2015/0180803 | A1* | 6/2015 | Li | ........................ G06F 13/4282 |
| | | | | 370/458 |
| 2016/0006655 | A1 | 1/2016 | Hyoudou et al. | |
| 2018/0102959 | A1 | 4/2018 | Ganichev et al. | |

(Continued)

FOREIGN PATENT DOCUMENTS

| | | |
|---|---|---|
| CN | 103475626 A | 12/2013 |
| CN | 109412922 A | 3/2019 |

(Continued)

*Primary Examiner* — Duc T Duong
(74) *Attorney, Agent, or Firm* — Conley Rose, P.C.

(57) ABSTRACT

A service processing method and a network device, where the network device includes a network processor (NP) and a central processing unit (CPU). The NP is configured to receive a first packet, obtain a packet feature of the first packet, obtain a processing rule corresponding to the packet feature, process the first packet based on the processing rule, to obtain a second packet, and send the second packet to the CPU. The CPU is configured to receive the second packet, and process the second packet. Before the CPU processes the first packet, the NP processes the first packet, and sends the second packet obtained after processing to the CPU.

20 Claims, 6 Drawing Sheets

(56) References Cited

U.S. PATENT DOCUMENTS

| | | | |
|---|---|---|---|
| 2018/0278548 A1* | 9/2018 | Pignataro | H04L 43/08 |
| 2019/0068491 A1* | 2/2019 | Tsirkin | H04L 41/082 |
| 2019/0306055 A1* | 10/2019 | Jiang | H04L 45/34 |
| 2020/0186389 A1 | 6/2020 | Zeng et al. | |
| 2020/0274787 A1* | 8/2020 | Dasgupta | H04L 43/0888 |
| 2021/0203619 A1* | 7/2021 | Lin | H04L 49/109 |
| 2021/0234768 A1* | 7/2021 | Pang | H04L 41/147 |

FOREIGN PATENT DOCUMENTS

| | | |
|---|---|---|
| JP | 2008085886 A | 4/2008 |
| JP | 2016019052 A | 2/2016 |
| WO | 2019033964 A1 | 2/2019 |

\* cited by examiner

SERVICE PROCESSING METHOD AND NETWORK DEVICE

CROSS-REFERENCE TO RELATED APPLICATION

This application claims priority to the Chinese Patent Application No. 201910320133.X filed on Apr. 19, 2019, which is incorporated herein in its entirety.

TECHNICAL FIELD

This application relates to the field of communications technologies, and in particular, to a service processing method and a network device.

BACKGROUND

With the popularity of the Internet, an edge router plays an important role in a network system. The edge router is oriented to transfer a user from a local area network to a wide area network. Nowadays, there is still a significant difference between the local area network technology and the wide area network technology, and the edge router needs to meet a variety of service requirements of users, for example, from simple networking to a complex multimedia service and a virtual private network (VPN) service.

Currently, services related to the edge router are all processed by a central processing unit (CPU) of the edge router. However, services related to the edge router are of a wide variety, and forwarding and processing capabilities of the CPU are difficult to improve. Consequently, service processing efficiency of the edge router is low.

SUMMARY

This application provides a service processing method and a network device, to simplify a process of processing a packet by a CPU in the network device, thereby improving service processing efficiency of the network device.

According to a first aspect, this application provides a network device, where the network device includes a network processor (NP) and a CPU. The NP is configured to receive a first packet, obtain a packet feature of the first packet, obtain a processing rule corresponding to the packet feature, process the first packet based on the processing rule, to obtain a second packet, and send the second packet to the CPU. The CPU is configured to receive the second packet, and process the second packet.

In a possible design, the CPU is further configured to send the processing rule to the NP.

In a possible design, the processing rule is reporting the packet feature. The NP is configured to add a first extension header to the first packet, to obtain the second packet, where the first extension header includes the packet feature. The CPU is configured to obtain the packet feature from the first extension header of the second packet, delete the first extension header from the second packet, to obtain the first packet, and forward the first packet based on the packet feature.

In a possible design, the processing rule is obtaining routing information. The NP is configured to add a first extension header to the first packet, to obtain the second packet, where the first extension header includes the routing information. The CPU is configured to obtain the routing information from the first extension header of the second packet, delete the first extension header from the second packet, to obtain the first packet, and forward the first packet based on the routing information.

In a possible design, the processing rule is reporting service information. The NP is configured to obtain a service configured on an interface that receives the first packet, and add a first extension header to the first packet, to obtain the second packet, where the first extension header includes information about the service. The CPU is configured to obtain the information about the service from the first extension header of the second packet, delete the first extension header from the second packet, to obtain the first packet, and perform the service on the first packet.

In a possible design, when obtaining the processing rule corresponding to the packet feature, the NP looks up in a rule table stored on the NP based on the packet feature, obtains the processing rule from the rule table when the rule table includes the processing rule, and when the rule table does not include the processing rule, sends the first packet or the packet feature to the CPU, and receives the processing rule returned by the CPU.

In a possible design, the NP further adds the processing rule to the rule table.

In a possible design, the CPU sends a third packet to the NP, where the third packet includes a second extension header, and the second extension header includes processing information and a layer 2 header.

The NP is configured to obtain the processing information and the layer 2 header in the second extension header, delete the second extension header from the third packet, to obtain a fourth packet, process the fourth packet based on the processing information, and add the layer 2 header to the fourth packet, to obtain a fifth packet.

According to a second aspect, this application provides a service processing method, applied to a network device, where the network device includes an NP and a CPU, and the method includes receiving, by the NP, a first packet, and obtaining a packet feature of the first packet, obtaining, by the NP, a processing rule corresponding to the packet feature, and processing the first packet based on the processing rule, to obtain a second packet, sending, by the NP, the second packet to the CPU, and receiving and processing, by the CPU, the second packet.

In a possible design, the CPU sends the processing rule to the NP.

In a possible design, the processing rule is reporting the packet feature. Processing, by the NP, the first packet based on the processing rule, to obtain a second packet includes adding, by the NP, a first extension header to the first packet, to obtain the second packet, where the first extension header includes the packet feature, and processing, by the CPU, the second packet includes obtaining, by the CPU, the packet feature from the first extension header of the second packet, deleting the first extension header from the second packet, to obtain the first packet, and forwarding the first packet based on the packet feature.

In a possible design, the processing rule is obtaining routing information. Processing, by the NP, the first packet based on the processing rule, to obtain a second packet includes adding, by the NP, a first extension header to the first packet, to obtain the second packet, where the first extension header includes the routing information, and processing, by the CPU, the second packet includes obtaining, by the CPU, the routing information from the first extension header of the second packet, deleting the first extension header from the second packet, to obtain the first packet, and forwarding the first packet based on the routing information.

In a possible design, the processing rule is reporting service information. Processing, by the NP, the first packet based on the processing rule, to obtain a second packet includes obtaining, by the NP, a service configured on an interface that receives the first packet, and adding a first extension header to the first packet, to obtain the second packet, where the first extension header includes information about the service, and processing, by the CPU, the second packet includes obtaining, by the CPU, the information about the service from the first extension header of the second packet, deleting the first extension header from the second packet, to obtain the first packet, and performing the service on the first packet.

In a possible design, obtaining, by the NP, a processing rule corresponding to the packet feature includes looking up, by the NP, in a rule table stored on the NP based on the packet feature, obtaining the processing rule from the rule table when the rule table includes the processing rule, sending the first packet or the packet feature to the CPU when the rule table does not include the processing rule, and receiving the processing rule returned by the CPU.

In a possible design, after receiving, by the NP, the processing rule returned by the CPU, the method further includes adding, by the NP, the processing rule to the rule table.

In a possible design, the method further includes sending, by the CPU, a third packet to the NP, where the third packet includes a second extension header, and the second extension header includes processing information and a layer 2 header, and obtaining, by the NP, the processing information and the layer 2 header in the second extension header, deleting the second extension header from the third packet, to obtain a fourth packet, processing the fourth packet based on the processing information, and adding the layer 2 header to the fourth packet, to obtain a fifth packet.

According to a third aspect, this application provides a network device, where the network device includes a processor and a memory, and the memory stores a computer-executable instruction, and the processor executes the computer-executable instruction stored in the memory, to implement any one of the methods according to the second aspect of this application.

According to a fourth aspect, this application provides a computer-readable storage medium, where the computer-readable storage medium stores program code, and when executed by a processor, the program code implements any one of the methods according to the second aspect of this application.

According to a fifth aspect, this application provides a program product, where the program product includes a computer program, the computer program is stored in a readable storage medium, a processor of a network device may read the computer program from the readable storage medium, and the processor executes the computer program, to enable the network device to perform any one of the methods according to the second aspect of this application.

According to the service processing method and the network device provided by this application, before the CPU of the network device processes the first packet, the NP of the network device first processes the first packet, and sends the second packet obtained after processing to the CPU such that the CPU may directly process the second packet, to simplify the process of processing the received packet by the CPU, thereby improving the service processing efficiency of the network device.

DESCRIPTION OF EMBODIMENTS

The term "at least one" in this application refers to one or more, and the term "a plurality of" refers to two or more. The term "and/or" describes an association relationship between associated objects and represents that three relationships may exist. For example, A and/or B may represent the following three cases, only A exists, both A and B exist, and only B exists. A and B may be singular or plural. The character "/" generally indicates an "or" relationship between the associated objects. "At least one of the following items" or other similar expressions refer to any combination of the items, including any combination of a single item or a plurality of items. For example, at least one of a, b, or c may be expressed as: a, b, c, a-b, a-c, b-c, or a-b-c, where a, b, and c may be singular or plural.

Figure 1:
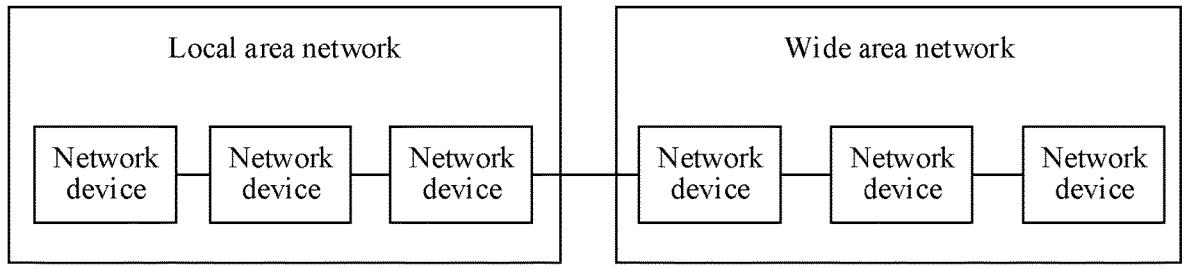
FIG. 1 is a schematic diagram of a communications system according to an embodiment of this application.

FIG. 1 is a schematic diagram of a communications system according to an embodiment of this application. As shown in FIG. 1, the communications system includes a plurality of network devices. Some network devices are located in a local area network, and some network devices are located in a wide area network, and a packet may be forwarded between the network devices, to be transmitted from a source network device to a target network device. Using the network device, the packet may be forwarded between the local area network and the wide area network.

Edge network devices among the network devices may use solutions in embodiments of this application. It should be noted that the network device in the embodiments of this application is not limited to the edge network device.

Figure 2:
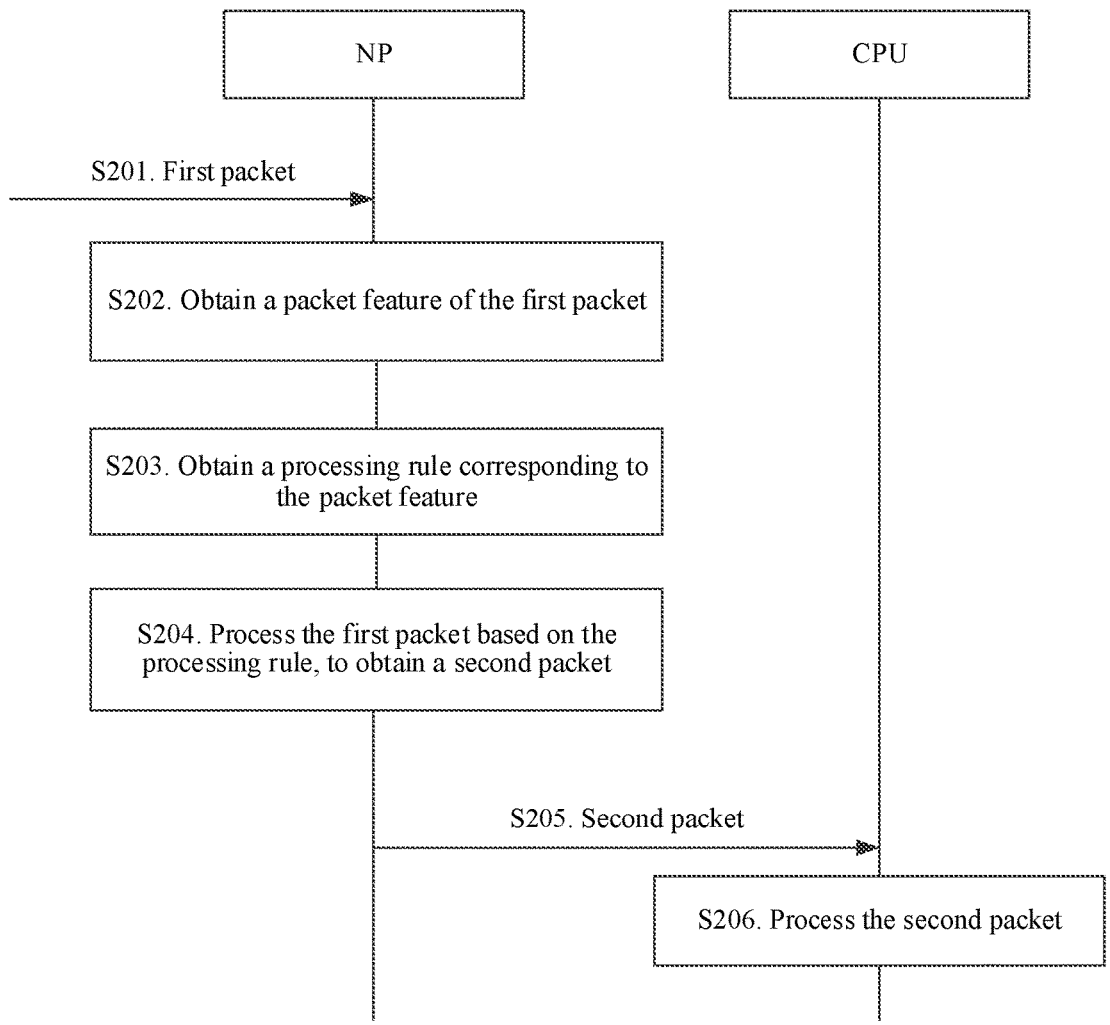
FIG. 2 is a flowchart of a service processing method according to an embodiment of this application.

FIG. 2 is a flowchart of a service processing method according to an embodiment of this application. The service processing method is applied to a network device, where the network device includes an NP and a CPU. As shown in FIG. 2, the method of this embodiment may include the following steps.

S201. The NP receives a first packet.

S202. The NP obtains a packet feature of the first packet.

In this embodiment, the packet received by the NP may be any packet, the packet herein is referred to as the first packet, and after the first packet is received, the packet feature of the first packet is obtained from the first packet. The packet feature may be, for example, at least one of a media access control (MAC) address, virtual local area network (VLAN) information, a destination port number, a source port number, a protocol number, an Internet Protocol (IP) address and other information.

Optionally, the NP may further obtain other information corresponding to the first packet from the first packet, for example, information about a to-be-processed service included in the first packet, routing information of the first packet, and a service configured on an interface that receives the first packet.

S203. The NP obtains a processing rule corresponding to the packet feature.

In a possible design, the CPU sends the processing rule to the NP. The CPU may actively send the processing rule to the NP, or after receiving a request that is for obtaining the processing rule and that is sent by the NP, the CPU sends the processing rule to the NP. The NP processes the received packet based on the processing rule, and a manner in which the NP processes the packet is standardized, thereby improving efficiency of processing the packet by the NP.

In a possible design, one possible implementation of S203 may include looking up, by the NP, in a rule table stored on the NP based on the packet feature, obtaining the processing rule from the rule table when the rule table includes the processing rule, and sending the first packet or the packet feature to the CPU when the rule table does not include the processing rule, and receiving the processing rule returned by the CPU.

In this embodiment, the NP stores the processing rule corresponding to the packet feature of the packet, and the processing rule is stored in a form of the rule table. Therefore, after obtaining the packet feature of the first packet, the NP looks up in the rule table based on the packet feature of the first packet, to obtain the processing rule corresponding to the packet feature of the first packet. When the rule table of the NP already includes the processing rule corresponding to the packet feature of the first packet, the NP directly obtains the processing rule corresponding to the packet feature of the first packet from the rule table. When the rule table does not include the processing rule corresponding to the packet feature of the first packet, the NP needs to obtain the processing rule corresponding to the packet feature of the first packet from the CPU. In an implementation, the NP may add an extension header to the first packet, to obtain a packet, where the extension header includes first information, and the first information is used to indicate that the NP does not include the processing rule, and then the NP sends the packet to the CPU, to request to obtain the processing rule from the CPU. The CPU receives the packet sent by the NP, obtains the first information from the extension header of the packet, and sends the processing rule to the NP based on the first information. In another implementation, the NP may alternatively send the packet feature of the first packet to the CPU, and the CPU receives the packet feature of the first packet sent by the NP, and sends the processing rule corresponding to the packet feature of the first packet to the NP based on the packet feature of the first packet. Correspondingly, the NP receives the processing rule that corresponds to the packet feature of the first packet and that is sent by the CPU, and processes the first packet based on the processing rule, to obtain a second packet.

In this embodiment, after obtaining the packet feature, the NP in the network device first looks up in the rule table for the processing rule corresponding to the packet feature, and when the rule table does not include the processing rule corresponding to the packet feature, the NP sends the first packet or the packet feature to the CPU, to obtain the processing rule corresponding to the packet feature. In this way, a processing amount of the CPU is reduced, thereby improving processing efficiency of the CPU.

In a possible design, after obtaining, by the NP, a processing rule corresponding to the packet feature, the method further includes adding, by the NP, the processing rule to the rule table.

In this embodiment, after receiving the processing rule that corresponds to the packet feature of the first packet and that is sent by the CPU, the NP adds the processing rule corresponding to the packet feature of the first packet to the rule table such that when subsequently receiving a packet that has a same packet feature as that of the first packet, the NP may directly finds the processing rule corresponding to the packet feature from the rule table, to avoid a case in which processing amounts of the NP and the CPU are increased because the NP needs to obtain the processing rule from the CPU each time the NP receives the packet, and improve efficiency of processing the packet by the CPU, thereby improving service processing efficiency of the network device.

S204. The NP processes the first packet based on the processing rule, to obtain a second packet.

In this embodiment, after obtaining the packet feature of the first packet, the NP obtains the processing rule corresponding to the packet feature, where the processing rule is content agreed between the NP and the CPU. The processing rule, for example, may be that the NP obtains the packet feature of the packet received by the NP and sends the packet feature to the CPU, or may be that the NP obtains routing information of the packet received by the NP and sends the routing information to the CPU, or may be that the NP obtains a task configured on an interface that receives the packet, and sends the task to the CPU, where the interface that receives the packet is, for example, a physical interface or a virtual interface on the network device. The NP processes the first packet based on the processing rule, to obtain the second packet, and the second packet may include information included in the first packet that is parsed by the NP.

S205. The NP sends the second packet to the CPU, and correspondingly, the CPU receives the second packet.

S206. The CPU processes the second packet.

In this embodiment, the NP sends the second packet to the CPU, and the CPU receives the second packet. Then the CPU processes the second packet. Because the second packet is obtained after processing by the NP based on the processing rule, the CPU does not need to process the received packet based on the processing rule, to simplify a process of processing the received packet by the CPU.

In this embodiment, the network device includes the NP and the CPU, where the NP receives the first packet, obtains the packet feature of the first packet, obtains the processing rule corresponding to the packet feature, processes the first packet based on the processing rule, to obtain the second packet, and sends the second packet to the CPU, and the CPU receives and processes the second packet. Before the CPU processes the first packet, the NP processes the first packet, and sends the second packet obtained after processing to the CPU such that the CPU may directly process the second packet, to simplify the process of processing, by the CPU, the packet received by the CPU, thereby improving service processing efficiency of the network device.

Figure 3:
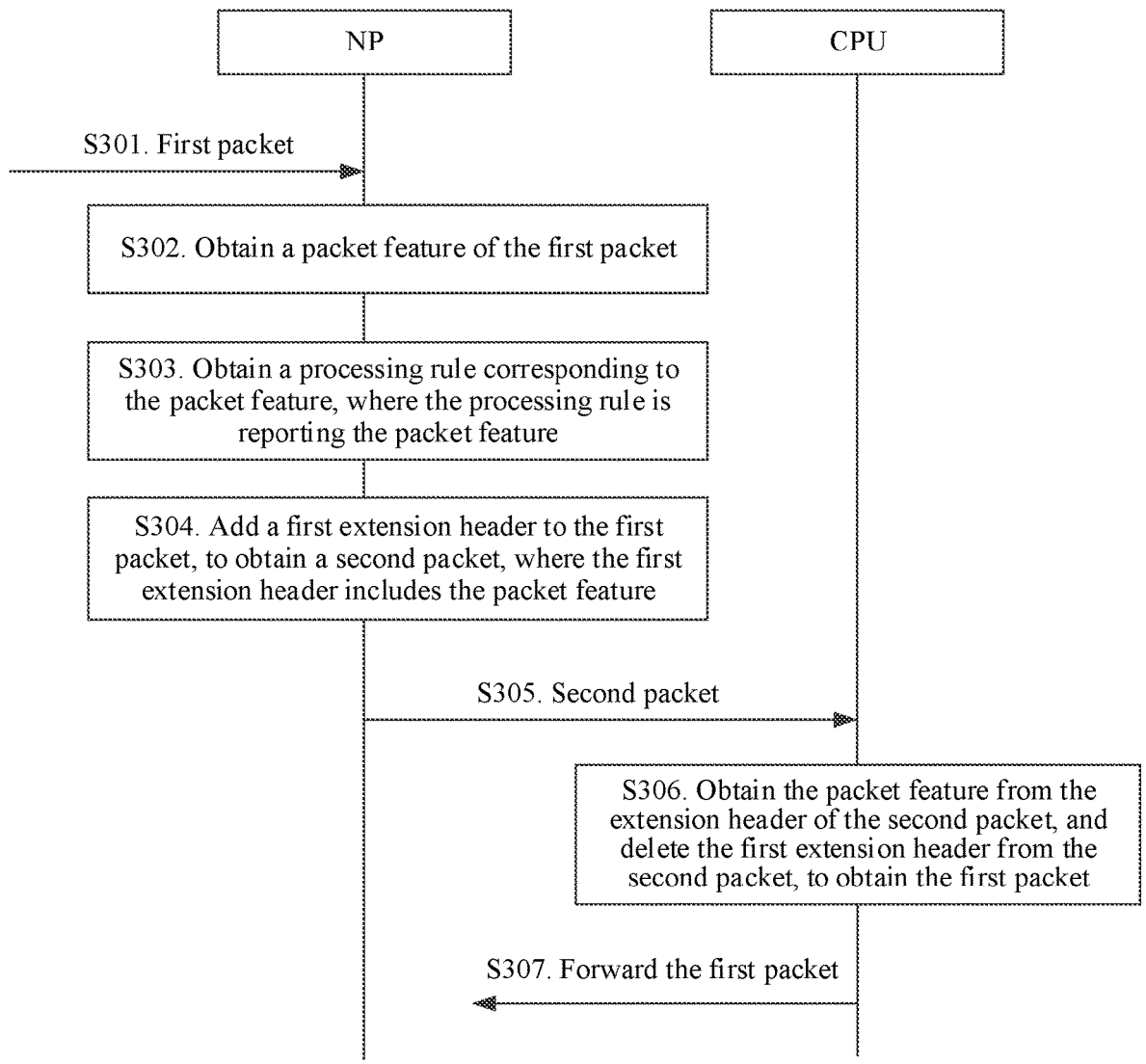
FIG. 3 is a flowchart of a service processing method according to another embodiment of this application.

FIG. 3 is a flowchart of a service processing method according to another embodiment of this application. The service processing method is applied to a network device, where the network device includes an NP and a CPU. As shown in FIG. 3, the method in this embodiment is described using an example in which a processing rule includes reporting a packet feature, and the method in this embodiment may include the following steps.

S301. The NP receives a first packet.

S302. The NP obtains a packet feature of the first packet.

In this embodiment, for specific implementations of S301 and S302, refer to S201 and S202, and details are not described herein again.

S303. The NP obtains a processing rule corresponding to the packet feature, where the processing rule is reporting the packet feature.

S304. The NP adds a first extension header to the first packet, to obtain a second packet, where the first extension header includes the packet feature.

S305. The NP sends the second packet to the CPU, and correspondingly, the CPU receives the second packet.

In this embodiment, the processing rule obtained by the NP may be reporting the packet feature, and the reporting the packet feature is used to instruct the NP to send both the first packet and the packet feature of the first packet to the CPU. Therefore, the NP may add an extension header to the first packet, the extension header herein is referred to as the first extension header, and the first extension header includes the packet feature, to obtain the second packet that includes the packet feature of the first packet and the first packet. The NP sends the second packet obtained after processing based on the reported packet feature to the CPU.

S306. The CPU obtains the packet feature from the first extension header of the second packet, and deletes the first extension header from the second packet, to obtain the first packet.

S307. The CPU forwards the first packet based on the packet feature.

In this embodiment, when the CPU receives the second packet that includes the packet feature of the first packet, because the NP already adds the packet feature of the first packet to the first extension header of the second packet, the CPU directly obtains the packet feature of the first packet from the first extension header of the second packet. Then, the CPU deletes the first extension header of the second packet, to obtain the first packet, and forwards the first packet based on information included in the packet feature of the first packet. For example, the packet feature includes a MAC address, and the CPU forwards the first packet based on the MAC address at which the first packet is received.

In this embodiment, the NP in the network device adds the first extension header that includes the packet feature to the first packet based on the processing rule of reporting the packet feature, to obtain the second packet, and sends the second packet to the CPU such that the CPU may directly obtain the packet feature of the first packet from the first extension header of the second packet, and does not need to analyze the obtained first packet to obtain the packet feature of the first packet, to simplify a process of processing the packet by the CPU, reduce time of processing the packet by the CPU, and improve efficiency of forwarding and processing the packet by the CPU, thereby improving service processing efficiency of the network device.

Figure 4:
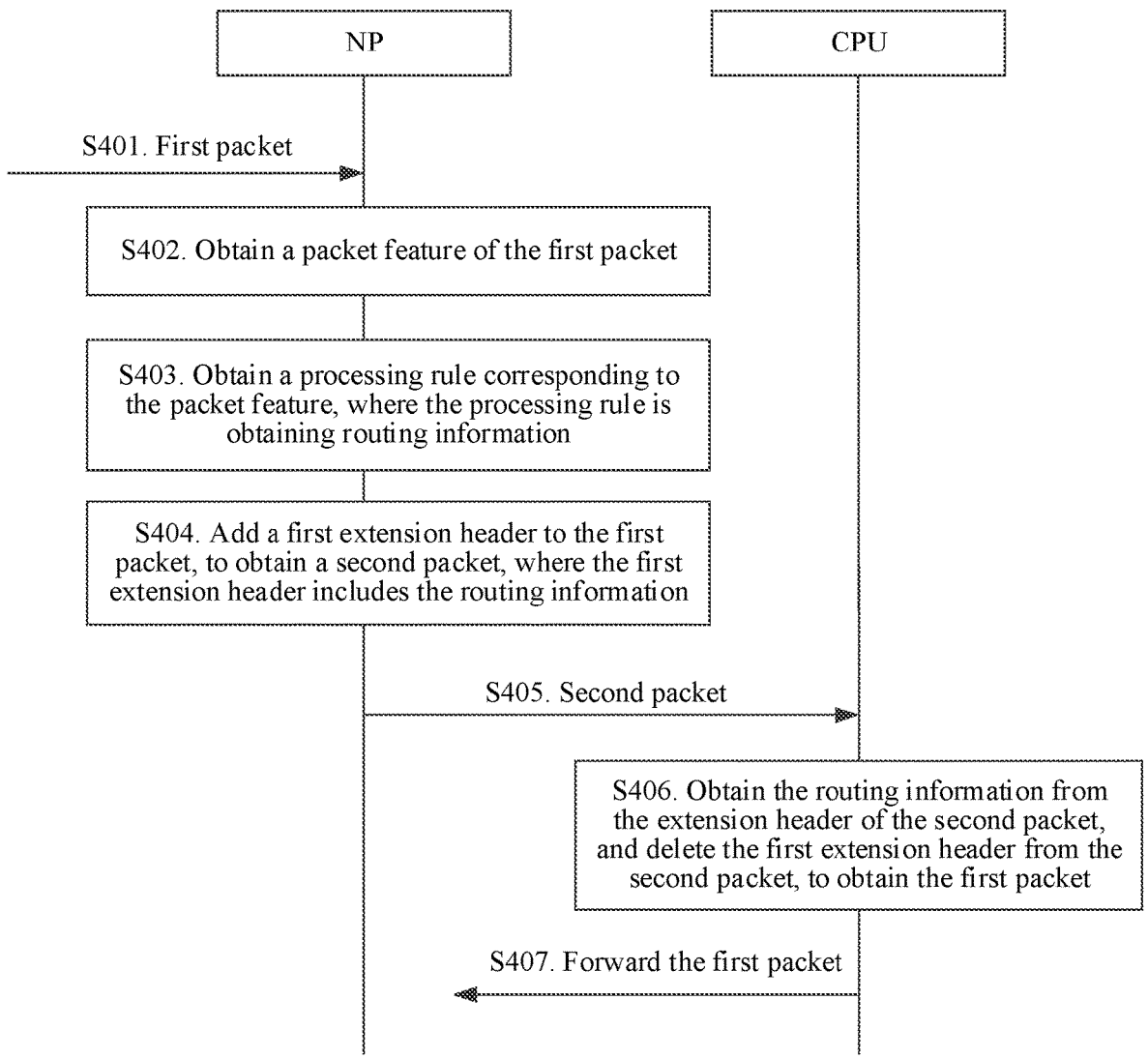
FIG. 4 is a flowchart of a service processing method according to another embodiment of this application.

FIG. 4 is a flowchart of a service processing method according to another embodiment of this application. The service processing method is applied to a network device, where the network device includes an NP and a CPU. As shown in FIG. 4, the method in this embodiment is described using an example in which a processing rule includes obtaining routing information, and the method in this embodiment may include the following steps.

S401. The NP receives a first packet.

S402. The NP obtains a packet feature of the first packet.

In this embodiment, for specific implementations of S401 and S402, refer to S201 and S202, and details are not described herein again.

S403. The NP obtains a processing rule corresponding to the packet feature, where the processing rule is obtaining routing information.

S404. The NP adds a first extension header to the first packet, to obtain a second packet, where the first extension header includes the routing information.

S405. The NP sends the second packet to the CPU, and correspondingly, the CPU receives the second packet.

In this embodiment, the processing rule obtained by the NP may be obtaining the routing information, and obtaining the routing information is that the CPU obtains, from the NP, the routing information of the first packet obtained by the NP, and in this case, the NP needs to send both the first packet and the routing information of the first packet to the CPU. Therefore, the NP may add an extension header to the first packet, the extension header herein is referred to as the first extension header, and the first extension header includes the routing information, to obtain the second packet that includes the routing information of the first packet and the first packet. The routing information may include, for example, a route index, where the route index is an identifier of a router entry, and the identifier of the router entry is used to indicate a storage location of the router entry in a routing table. The NP sends the second packet obtained after processing based on the processing rule to the CPU.

S406. The CPU obtains the routing information from the first extension header of the second packet, and deletes the first extension header from the second packet, to obtain the first packet.

S407. The CPU forwards the first packet based on the routing information.

In this embodiment, when the CPU receives the second packet that includes the routing information of the first packet, because the NP already adds the routing information of the first packet to the first extension header of the second packet, the CPU directly obtains the routing information of the first packet from the first extension header of the second packet. Then, the CPU deletes the first extension header of the second packet, to obtain the first packet, and forwards the first packet based on the routing information of the first packet. For example, if the routing information includes the route index, after obtaining the route index, the CPU finds the storage location of the router entry in the routing table based on the route index such that the router entry stored in the storage location indicated by the route index may be obtained.

In this embodiment, the NP in the network device adds the first extension header that includes the routing information to the first packet based on the obtaining the routing information, to obtain the second packet, and sends the second packet to the CPU such that the CPU may directly obtain the routing information of the first packet from the first extension header of the second packet, and forward the first packet based on the routing information, and does not need to analyze the first packet to obtain the routing information of the first packet, to simplify a process of processing a packet by the CPU, reduce time of processing the packet by the CPU, and improve efficiency of forwarding and processing the packet by the CPU, thereby improving service processing efficiency of the network device.

In some embodiments, based on the embodiment shown in FIG. 3 or FIG. 4, when the CPU forwards the first packet, the CPU may forward the first packet to the NP such that the CPU may hand over, to the NP, subsequent forwarding in a process required to complete forwarding of the first packet. For example, when forwarding the first packet, the CPU needs to encapsulate the first packet. Currently, the encapsulation of the first packet is completed by the CPU. In this application, the CPU hands over the process of encapsulating the first packet to the NP, to reduce a processing amount of the CPU, and improve forwarding and processing efficiency of the CPU, thereby improving service processing efficiency of the network device, and reducing processing time of the packet.

Figure 5:
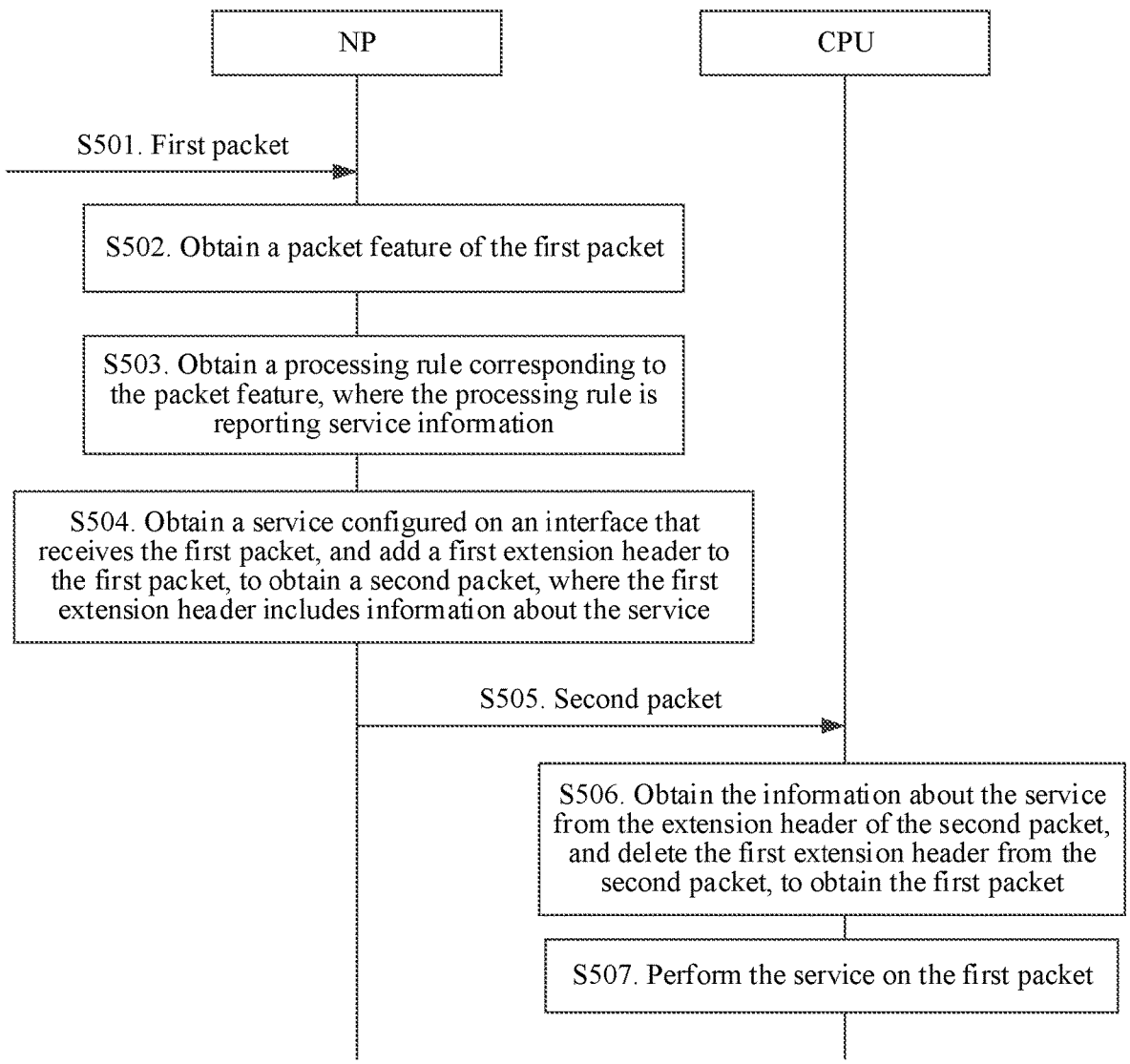
FIG. 5 is a flowchart of a service processing method according to another embodiment of this application.

FIG. 5 is a flowchart of a service processing method according to another embodiment of this application. The service processing method is applied to a network device, where the network device includes an NP and a CPU. As shown in FIG. 5, the method in this embodiment is described using an example in which a processing rule includes reporting service information, and the method in this embodiment may include the following steps.

S501. The NP receives a first packet.

S502. The NP obtains a packet feature of the first packet.

In this embodiment, for specific implementations of S501 and S502, refer to S201 and S202, and details are not described herein again.

S503. The NP obtains a processing rule corresponding to the packet feature, where the processing rule is reporting service information.

S504. The NP obtains a service configured on an interface that receives the first packet, and adds a first extension header to the first packet, to obtain a second packet, where the first extension header includes information about the service.

S505. The NP sends the second packet to the CPU, and correspondingly, the CPU receives the second packet.

In this embodiment, the processing rule obtained by the NP may be reporting the service information, and reporting the service information is used to instruct the NP to send both the first packet and the obtained service information of the first packet to the CPU. Therefore, the NP obtains the service configured on the interface that receives the first packet, forms the service information using the obtained service configured on the interface that receives the first packet, and adds an extension header to the first packet, the extension header herein is referred to as the first extension header, and the first extension header includes the service information, to obtain the second packet that includes the service information of the first packet and the first packet. The NP sends the second packet obtained after processing based on the processing rule to the CPU.

There is at least one service that is obtained by the NP and that is configured on the interface that receives the first packet. Therefore, the service information includes information about at least one service, and when the service information includes a plurality of pieces of information about services, the service information is a service stack formed by information about a plurality of services.

Optionally, in the at least one service that is obtained by the NP and that is configured on the interface that receives the first packet, a service that the NP can process may exist, and a service that the NP cannot process may also exist. Therefore, the NP may add information about the service that the NP cannot process to the first extension header, or the NP may alternatively add information about the at least one service configured on the interface that receives the first packet to the extension header. This is not limited in this embodiment of this application.

S506. The CPU obtains the information about the service from the first extension header of the second packet, and deletes the first extension header from the second packet, to obtain the first packet.

S507. The CPU performs the service on the first packet.

In this embodiment, when the CPU receives the information about the service configured on the interface that receives the first packet, because the NP already adds the information about the service configured on the interface that receives the first packet to the first extension header of the second packet, the CPU directly obtains, from the first extension header of the second packet, the information about the service configured on the interface that receives the first packet. Then, the CPU deletes the first extension header of the second packet, to obtain the first packet. Then, the CPU performs the service based on the service information. For example, if the service that is configured on the interface receiving the first packet and that is obtained by the CPU using the service information is collecting statistics on traffic, the CPU performs a service of collecting statistics on traffic.

In this embodiment, the NP in the network device adds, based on the processing rule, the service configured on the interface that receives the first packet to the first extension header of the second packet, and sends the service to the CPU such that the CPU may directly obtain, from the first extension header of the second packet, the information about the service configured on the interface that receives the first packet, to directly process the service, and does not need to analyze the received packet to obtain the information about the service configured on the interface that receives the packet, to reduce time of processing the packet by the CPU, reduce the processing amount of the CPU, and improve efficiency of forwarding and processing the packet by the CPU, thereby improving service processing efficiency of the network device.

Figure 6:
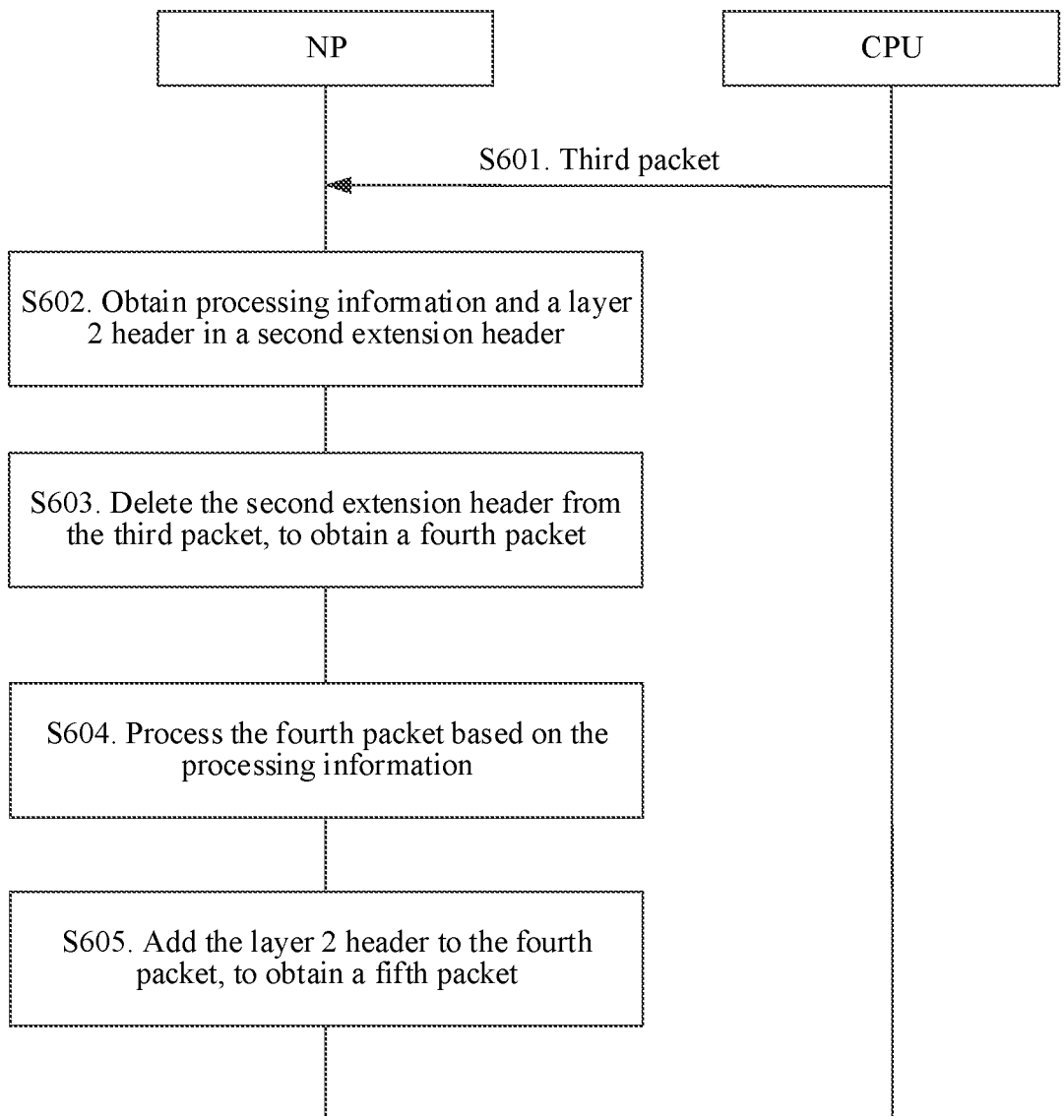
FIG. 6 is a flowchart of a service processing method according to another embodiment of this application.

FIG. 6 is a flowchart of a service processing method according to another embodiment of this application. As shown in FIG. 6, based on the embodiments shown in FIG. 2 to FIG. 5, the service processing method provided in this application may further include the following steps.

S601. The CPU sends a third packet to the NP, where the third packet includes a second extension header, and the second extension header includes processing information and a layer 2 header.

In this embodiment, the packet that should have been processed by the CPU may be handed over to the NP for processing, and in this case, when there is such a packet that needs to be processed, the NP may directly process the packet, without occupying processing resources of the CPU. For example, an implementation may be that the CPU sends a third packet to the NP, where the third packet includes a second extension header, and the second extension header includes processing information and a layer 2 header. The processing information is used to notify the NP of a manner of processing the packet and information required for processing the packet. For example, the CPU notifies, using the processing information, the NP of whether to encapsulate the layer 2 header, or whether to change fields in the packet. The CPU instructs, using the processing information, the NP to add a field to the packet, and sends the to-be-added field to the NP using the processing information, and the layer 2 header includes, for example, a MAC address, or VLAN information.

S602. The NP obtains the processing information and the layer 2 header in the second extension header.

S603. The NP deletes the second extension header from the third packet, to obtain a fourth packet.

S604. The NP processes the fourth packet based on the processing information.

S605. The NP adds the layer 2 header to the fourth packet, to obtain a fifth packet.

In this embodiment, the NP receives the third packet, and after obtaining the processing information and the layer 2 header from the second extension header of the third packet, the NP deletes the second extension header of the third packet, to obtain the fourth packet. Then, the NP adds the obtained layer 2 header to the fourth packet, to obtain the fifth packet.

This embodiment is described using an example in which layer 2 virtual extensible local area network (VXLAN) processing that should have been performed by the CPU is handed over to the NP for processing.

The CPU configures the layer 2 VXLAN, and sends information related to the layer 2 VXLAN to the NP such that the NP performs encapsulation and decapsulation of the layer 2 VXLAN on the packet based on the information related to the layer 2 VXLAN. The information related to the layer 2 VXLAN may include, for example, any one or more of an instruction of performing encapsulation and decapsulation of VXLAN on the packet, a MAC address, a VLAN identifier, a source IP address used for VXLAN encapsulation, a destination IP address used for VXLAN encapsulation, and a VXLAN network identifier used for VXLAN encapsulation.

In this embodiment, the CPU hands over the packet that should have been processed by the CPU to the NP for processing, to reduce a quantity of packets processed by the CPU, and improve efficiency of forwarding and processing the packet by the CPU, thereby improving service processing efficiency of the network device, and reducing time of forwarding and processing the packet.

Based on the above, in this embodiment of this application, the CPU and the NP may be integrated to collaboratively process the packet, or the packet processed by the CPU may be handed over to the NP for independent processing such that the NP undertakes a part of work of the CPU, to improve efficiency of forwarding and processing the packet by the CPU, thereby improving service processing efficiency of the network device, and reducing time of processing the packet.

Figure 7:
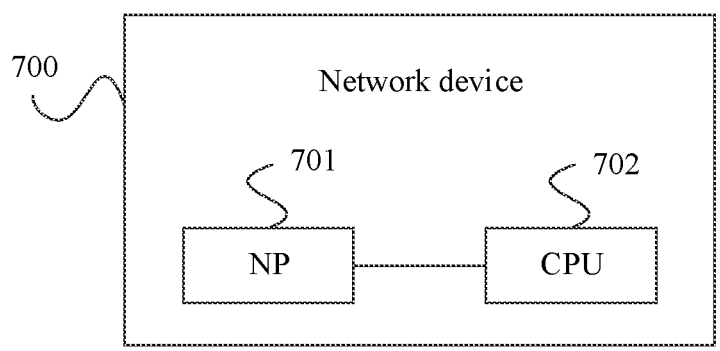
FIG. 7 is a schematic structural diagram of a network device according to an embodiment of this application.

FIG. 7 is a schematic structural diagram of a network device 700 according to an embodiment of this application. As shown in FIG. 7, the network device 700 provided in this embodiment includes an NP 701 and a CPU 702. The NP 701 is configured to receive a first packet, obtain a packet feature of the first packet, obtain a processing rule corresponding to the packet feature, process the first packet based on the processing rule, to obtain a second packet, and send the second packet to the CPU 702, and the CPU 702 is configured to receive the second packet, and process the second packet.

In a possible design, the CPU 702 is further configured to send the processing rule to the NP 701.

In a possible design, the processing rule is reporting the packet feature, where the NP 701 is configured to add a first extension header to the first packet, to obtain the second packet, where the first extension header includes the packet feature, and the CPU 702 is configured to obtain the packet feature from the first extension header of the second packet, delete the extension header from the second packet, to obtain the first packet, and forward the first packet based on the packet feature. The processing rule is obtaining routing information. The NP 701 is configured to add a first extension header to the first packet, to obtain the second packet, and the first extension header includes the routing information. The CPU 702 is configured to obtain the routing information from the first extension header of the second packet, delete the first extension header from the second packet, to obtain the first packet, and forward the first packet based on the routing information.

In a possible design, the processing rule is reporting service information. The NP 701 is configured to obtain a service configured on an interface that receives the first packet, and add a first extension header to the first packet, to obtain the second packet, and the first extension header includes information about the service, and the CPU 702 is configured to obtain the information about the service from the first extension header of the second packet, delete the first extension header from the second packet, to obtain the first packet, and perform the service on the first packet.

In a possible design, when obtaining the processing rule corresponding to the packet feature, the NP 701 is configured to look up in a rule table stored on the NP 701 based on the packet feature, obtain the processing rule from the rule table when the rule table includes the processing rule, and when the rule table does not include the processing rule, send the packet or the packet feature to the CPU 702, and receive the processing rule returned by the CPU 702.

In a possible design, the NP 701 is further configured to add the processing rule to the rule table.

In a possible design, the CPU 702 is configured to send a third packet to the NP 701, where the third packet includes a second extension header, and the second extension header includes processing information and a layer 2 header.

The NP 701 is configured to obtain the processing information and the layer 2 header in the second extension header, delete the second extension header from the third packet, to obtain a fourth packet, process the fourth packet based on the processing information, and add the layer 2 header to the fourth packet, to obtain a fifth packet.

The network device provided in this embodiment may be configured to perform the technical solutions of the foregoing method embodiments. The implementation principles and technical effects are similar, and are not further described herein.

Figure 8:
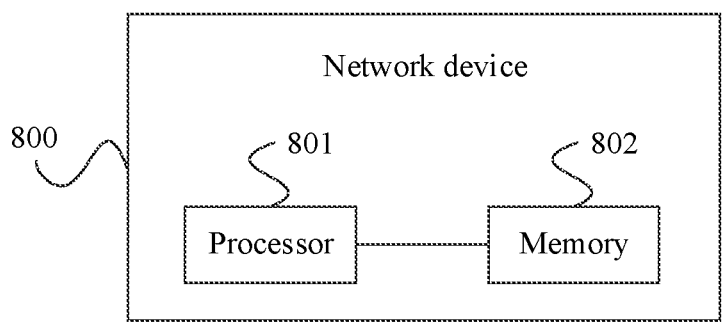
FIG. 8 is a schematic structural diagram of a network device according to another embodiment of this application.

FIG. 8 is a schematic structural diagram of a network device 800 according to another embodiment of this application. As shown in FIG. 8, the network device 800 of this embodiment may include at least one processor 801 and a memory 802. A network device having one processor is used as an example in FIG. 8.

The memory 802 is configured to store a program. Further, the program may include program code, and the program code includes a computer-executable instruction. The memory 802 may include a high speed random access memory (RAM), or may further include a non-volatile memory, such as at least one magnetic disk memory.

The processor 801 is configured to execute the computer-executable instruction stored in the memory 802, to implement the service processing method shown in the foregoing method embodiments and performed in the foregoing embodiments.

Optionally, in a specific implementation, if the memory 802 and the processor 801 are independently implemented, the memory 802 and the processor 801 may be connected to each other using a bus and complete communication between each other. The bus may be an Industry Standard Architecture (ISA) bus, a Peripheral Component Interconnect (PCI) bus or an Extended ISA (EISA) bus, or the like. The bus may be categorized as an address bus, a data bus, a control bus, or the like, but this does not mean that there is only one bus or a bus of one type.

Optionally, in a specific implementation, if the memory 802 and the processor 801 are integrated on one chip for implementation, the memory 802 and the processor 801 may complete communication between each other using an internal interface.

The network device in this embodiment may be configured to perform the technical solutions of the foregoing method embodiments. The implementation principles and technical effects are similar, and are not described herein again.

When the functions are implemented in the form of a software functional unit and sold or used as an independent product, the functions may be stored in one computer-readable storage medium. Based on such an understanding, the technical solutions of this application essentially, or the part contributing to other approaches, or some of the technical solutions may be implemented in a form of a software product. The software product is stored in one storage medium, and includes several instructions for instructing a computer device (which may be a personal computer, a server, a network device, or the like) to perform all or some of the steps of the methods described in the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A network device comprising:
a network processor (NP) configured to:
receive a first packet;
obtain a packet feature of the first packet;
obtain a processing rule corresponding to the packet feature, wherein the processing rule comprises reporting the packet feature;
process the first packet based on the processing rule to obtain a second packet, wherein the NP is configured to add a first extension header to the first packet to obtain the second packet, wherein the extension header comprises the packet feature; and
send the second packet; and
a central processing unit (CPU) coupled to the NP and configured to:
receive the second packet from the NP; and
process the second packet comprising:
obtaining the packet feature from the first extension header of the second packet;
deleting the first extension header from the second packet to obtain the first packet; and
forwarding the first packet based on the packet feature.

2. The network device of claim 1, wherein the NP is further configured to:
search the processing rule in a rule table stored on the NP based on the packet feature;
obtain the processing rule from the rule table when the rule table comprises the processing rule; and
when the rule table does not comprise the processing rule:
send the first packet or the packet feature to the CPU; and
receive the processing rule from the CPU.

3. The network device of claim 1, wherein the processing rule comprises obtaining routing information, wherein the NP is further configured to add the first extension header comprising the routing information to the first packet to obtain the second packet, and wherein the CPU is further configured to:
obtain the routing information from the first extension header of the second packet;
delete the first extension header from the second packet to obtain the first packet; and
forward the first packet based on the routing information.

4. The network device of claim 1, wherein the processing rule comprises reporting service information, and wherein the NP is further configured to:
obtain a service configured on an interface that receives the first packet; and
add the first extension header comprising information about the service to the first packet to obtain the second packet, and,
wherein the CPU is further configured to:
obtain the information about the service from the first extension header of the second packet;
delete the first extension header from the second packet to obtain the first packet; and
perform the service on the first packet.

5. The network device of claim 1, wherein the CPU is further configured to send a third packet to the NP, wherein the third packet comprises a second extension header comprising processing information and a layer 2 header, and wherein the NP is further configured to:
obtain the processing information and the layer 2 header in the second extension header;
delete the second extension header from the third packet to obtain a fourth packet;
process the fourth packet based on the processing information; and
add the layer 2 header to the fourth packet to obtain a fifth packet.

6. The network device of claim 2, wherein the NP is further configured to add the first extension header comprising the packet feature to the first packet to obtain the second packet, and wherein the CPU is further configured to:
obtain the packet feature from the first extension header of the second packet;
delete the first extension header from the second packet to obtain the first packet; and
forward the first packet based on the packet feature.

7. The network device of claim 2, wherein the processing rule comprises obtaining routing information, wherein the NP is further configured to add the first extension header comprising the routing information to the first packet to obtain the second packet, and wherein the CPU is further configured to:
obtain the routing information from the first extension header of the second packet;
delete the first extension header from the second packet to obtain the first packet; and
forward the first packet based on the routing information.

8. The network device of claim 2, wherein the processing rule comprises reporting service information, wherein the NP is further configured to:
obtain a service configured on an interface that receives the first packet; and
add the first extension header to the first packet to obtain the second packet, wherein the first extension header comprises information about the service and,
wherein the CPU is further configured to:
obtain the information about the service from the first extension header of the second packet;

delete the first extension header from the second packet to obtain the first packet; and
perform the service on the first packet.

9. The network device of claim 2, wherein the CPU is further configured to send a third packet to the NP, wherein the third packet comprises a second extension header comprising processing information and a layer 2 header, and wherein the NP is further configured to:
obtain the processing information and the layer 2 header in the second extension header;
delete the second extension header from the third packet to obtain a fourth packet;
process the fourth packet based on the processing information; and
add the layer 2 header to the fourth packet to obtain a fifth packet.

10. A service processing method applied to a network device, wherein the network device comprises a network processor (NP) and a central processing unit (CPU), and wherein the service processing method comprises:
receiving, by the NP, a first packet;
obtaining, by the NP, a packet feature of the first packet;
obtaining, by the NP, a processing rule corresponding to the packet feature, wherein the processing rule comprises reporting the packet feature;
processing, by the NP, the first packet based on the processing rule to obtain a second packet, wherein processing the first packet based on the processing rule comprises adding a first extension header to the first packet to obtain the second packet, wherein the first extension header comprises the packet feature;
sending, by the NP, the second packet to the CPU;
receiving, by the CPU and from the NP, the second packet; and
processing the second packet comprising:
obtaining the packet feature from the first extension header of the second packet;
deleting the first extension header from the second packet to obtain the first packet; and
forwarding the first packet based on the packet feature.

11. The service processing method of claim 10, wherein obtaining the processing rule further comprises:
searching, by the NP, the processing rule in a rule table stored on the NP based on the packet feature;
obtaining, by the NP, the processing rule from the rule table when the rule table comprises the processing rule; and
when the rule table does not comprise the processing rule:
sending, by the NP, the first packet or the packet feature to the CPU; and
receiving, by the NP, the processing rule from the CPU.

12. The service processing method of claim 10, wherein the processing rule comprises obtaining routing information, wherein processing the first packet further comprises adding, by the NP, the first extension header comprising the routing information to the first packet to obtain the second packet, and wherein processing the second packet further comprises:
obtaining, by the CPU, the routing information from the first extension header of the second packet;
deleting, by the CPU, the first extension header from the second packet to obtain the first packet; and
forwarding, by the CPU, the first packet based on the routing information.

13. The service processing method of claim 10, wherein the processing rule comprises reporting service information, and wherein processing the first packet further comprises:
obtaining, by the NP, a service configured on an interface that receives the first packet; and
adding, by the NP, the first extension header comprising information about the service to the first packet to obtain the second packet,
wherein processing the second packet further comprises:
obtaining, by the CPU, the information about the service from the first extension header of the second packet;
deleting, by the CPU, the first extension header from the second packet to obtain the first packet; and
performing, by the CPU, the service on the first packet.

14. The service processing method of claim 10, further comprising:
sending, by the CPU, a third packet to the NP, wherein the third packet comprises a second extension header comprising processing information and a layer 2 header;
obtaining, by the NP, the processing information and the layer 2 header in the second extension header;
deleting, by the NP, the second extension header from the third packet to obtain a fourth packet;
processing, by the NP, the fourth packet based on the processing information; and
adding, by the NP, the layer 2 header to the fourth packet to obtain a fifth packet.

15. The service processing method of claim 11, wherein processing the first packet further comprises adding the first extension header comprising the packet feature to the first packet to obtain the second packet, and wherein processing the second packet further comprises:
obtaining, by the CPU, the packet feature from the first extension header of the second packet;
deleting, by the CPU, the first extension header from the second packet to obtain the first packet; and
forwarding, by the CPU, the first packet based on the packet feature.

16. The service processing method of claim 11, wherein the processing rule comprises obtaining routing information, wherein processing the first packet further comprises adding the first extension header comprising the routing information to the first packet to obtain the second packet, and wherein processing the second packet further comprises:
obtaining, by the CPU, the routing information from the first extension header of the second packet;
deleting, by the CPU, the first extension header from the second packet to obtain the first packet; and
forwarding, by the CPU, the first packet based on the routing information.

17. The service processing method of claim 11, wherein the processing rule comprises reporting service information, and wherein processing the first packet further comprises:
obtaining, by the NP, a service configured on an interface that receives the first packet; and
adding, by the NP, the first extension header comprising information about the service to the first packet to obtain the second packet,
wherein processing the second packet further comprises:
obtaining, by the CPU, the information about the service from the first extension header of the second packet;
deleting, by the CPU, the first extension header from the second packet to obtain the first packet; and
performing, by the CPU, the service on the first packet.

18. The service processing method of claim 11, further comprising:
sending, by the CPU, a third packet to the NP, wherein the third packet comprises a second extension header comprising processing information and a layer 2 header;
obtaining, by the NP, the processing information and the layer 2 header in the second extension header;
deleting, by the NP, the second extension header from the third packet to obtain a fourth packet;
processing, by the NP, the fourth packet based on the processing information; and
adding, by the NP, the layer 2 header to the fourth packet to obtain a fifth packet.

19. A network device comprising:
a network processor (NP) configured to:
receive a first packet;
obtain a packet feature of the first packet;
obtain a processing rule corresponding to the packet feature, wherein the processing rule comprises obtaining routing information;
process the first packet based on the processing rule to obtain a second packet, wherein the NP is configured to add a first extension header to the first packet to obtain the second packet, wherein the first extension header comprises the routing information; and
send the second packet; and
a central processing unit (CPU) coupled to the NP and configured to:
receive the second packet from the NP; and
process the second packet, wherein the CPU is configured to:
obtain the routing information from the first extension header of the second packet;
delete the first extension header from the second packet to obtain the first packet; and
forward the first packet based on the packet feature.

20. The network device of claim 19, wherein the NP is further configured to:
search the processing rule in a rule table stored on the NP based on the packet feature;
obtain the processing rule from the rule table when the rule table comprises the processing rule; and
when the rule table does not comprise the processing rule:
send the first packet or the packet feature to the CPU; and
receive the processing rule from the CPU.

* * * * *